US012658786B1

(12) United States Patent
Onyeachu et al.

(10) Patent No.: US 12,658,786 B1
(45) Date of Patent: Jun. 16, 2026

(54) SELF-STARTING BI-MODAL OPERATING ISOLATED CONVERTERS

(71) Applicant: United States of America as represented by the Administrator of NASA, Washington, DC (US)

(72) Inventors: Chimaobi Onyeachu, Greenbelt, MD (US); Nicholas Franconi, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 337 days.

(21) Appl. No.: 18/372,433

(22) Filed: Sep. 25, 2023

(51) Int. Cl.
H02M 1/36 (2007.01)
H02M 3/335 (2006.01)

(52) U.S. Cl.
CPC ........... H02M 1/36 (2013.01); H02M 3/3353 (2013.01)

(58) Field of Classification Search
CPC .............................. H02M 1/36; H02M 3/3353
See application file for complete search history.

(56) References Cited

U.S. PATENT DOCUMENTS 3,257,597 A * 6/1966 Weiser ...................... B60L 9/12
388/822
3,701,937 A * 10/1972 Combs ................ H02M 3/3378
327/175

| | | | | |
|---|---|---|---|---|
| 4,020,408 A * | 4/1977 | Grant | .................. | H02M 3/3385 |
| | | | | 363/21.08 |
| 4,322,817 A * | 3/1982 | Kuster | ................ | H02M 3/3378 |
| | | | | 363/41 |
| 4,593,347 A * | 6/1986 | Peruth | .............. | H02M 3/33523 |
| | | | | 363/21.08 |
| 4,665,475 A * | 5/1987 | Brandstatter | ....... | H02M 3/3372 |
| | | | | 363/56.06 |
| 4,727,463 A * | 2/1988 | Suzuki | .............. | H02M 3/33507 |
| | | | | 363/21.17 |
| 4,872,100 A * | 10/1989 | Diaz | ..................... | H02M 7/797 |
| | | | | 363/79 |
| 5,315,214 A * | 5/1994 | Lesea | .................. | H02M 1/4225 |
| | | | | 315/307 |
| 5,402,043 A * | 3/1995 | Nilssen | ............. | H02M 7/53873 |
| | | | | 315/307 |
| 5,757,627 A * | 5/1998 | Faulk | ................ | H02M 3/33576 |
| | | | | 363/21.16 |
| 5,847,942 A * | 12/1998 | Bazinet | ............... | H02M 1/4258 |
| | | | | 363/40 |
| 5,959,856 A * | 9/1999 | Sturgeon | ........... | H02M 3/33571 |
| | | | | 363/17 |
| 6,456,511 B1 * | 9/2002 | Wong | ...................... | H02M 1/36 |
| | | | | 363/21.13 |

(Continued)

*Primary Examiner* — Yusef A Ahmed

(74) *Attorney, Agent, or Firm* — Derek J. Langdon; Matthew F. Johnston; Trenton J. Roche

(57) ABSTRACT

An apparatus and system for a Self-Starting Bi-Modal Operating Isolated Converter. The bootstrap issue in isolated power converters is traditionally solved by implementing a separate converter that provides isolated power to control the main converter. The instant disclosure solves the problem of bootstrapping isolated power converters by isolating the converter using a bi-modal operation of the power converter having a transition mode for the bootstrapping with a fixed frequency mode for general operation.

5 Claims, 5 Drawing Sheets

(56)          References Cited

U.S. PATENT DOCUMENTS

| | | | | |
|---|---|---|---|---|
| 7,535,734 | B2 * | 5/2009 | Li | H02M 1/4258 |
| | | | | 363/21.04 |
| 10,236,777 | B2 * | 3/2019 | Graves | H02M 3/33523 |
| 11,546,979 | B1 * | 1/2023 | Price | H05B 45/59 |
| 11,737,189 | B1 * | 8/2023 | Price | H02M 1/36 |
| | | | | 315/307 |
| 2008/0304299 | A1 * | 12/2008 | Bormann | H05B 45/375 |
| | | | | 363/89 |
| 2009/0097291 | A1 * | 4/2009 | Bormann | G06F 1/26 |
| | | | | 363/126 |
| 2015/0055379 | A1 * | 2/2015 | Fang | H02M 1/34 |
| | | | | 363/21.17 |
| 2015/0381065 | A1 * | 12/2015 | Yonezawa | H02M 3/3376 |
| | | | | 363/25 |
| 2016/0365794 | A1 * | 12/2016 | Lawson | H02J 3/32 |
| 2017/0288556 | A1 * | 10/2017 | Tang | H02M 3/33546 |
| 2019/0199222 | A1 * | 6/2019 | Lin | H02M 3/33507 |
| 2021/0226542 | A1 * | 7/2021 | Graves | H02M 3/33523 |

* cited by examiner

SELF-STARTING BI-MODAL OPERATING ISOLATED CONVERTERS

The invention described herein was made by an employee of the United States Government, and may be manufactured and used by or for the Government for governmental purposes without the payment of any royalties thereon or therefor.

CROSS-REFERENCE TO RELATED APPLICATIONS

Not Applicable.

BACKGROUND

Technical Field or Field of the Disclosure. The disclosure relates to an apparatus and system of a Self-Starting Bi-Modal Operating Isolated Converters.

Description of the Prior Art. The problem of bootstrapping isolated power converters is traditionally accomplished by implementing a separate converter that provides isolated power to control the main converter. This requires a separate converter that is isolated from the main converter. This requires an isolated bootstrap converter and a spread out setup. The instant Disclosure seeks to solve these problems using a bi-modal operation of the power converter having a transition mode for the bootstrapping with a fixed frequency mode for general operation.

SUMMARY OF THE DISCLOSURE

It is a feature of illustrative embodiments of the present invention to provide a system and apparatus for a self-starting bi-modal operating isolated converters. This system utilizes Gallium Nitride transistors to control operation of a converter in transition mode, where the converter self-starts in the transition mode and migrates to fixed frequency operation to a regulated output via a closed feedback. The system is applicable to both flyback and buck-derived topologies and achieves high density and efficiency.

DETAILED DESCRIPTION

Figure 1:
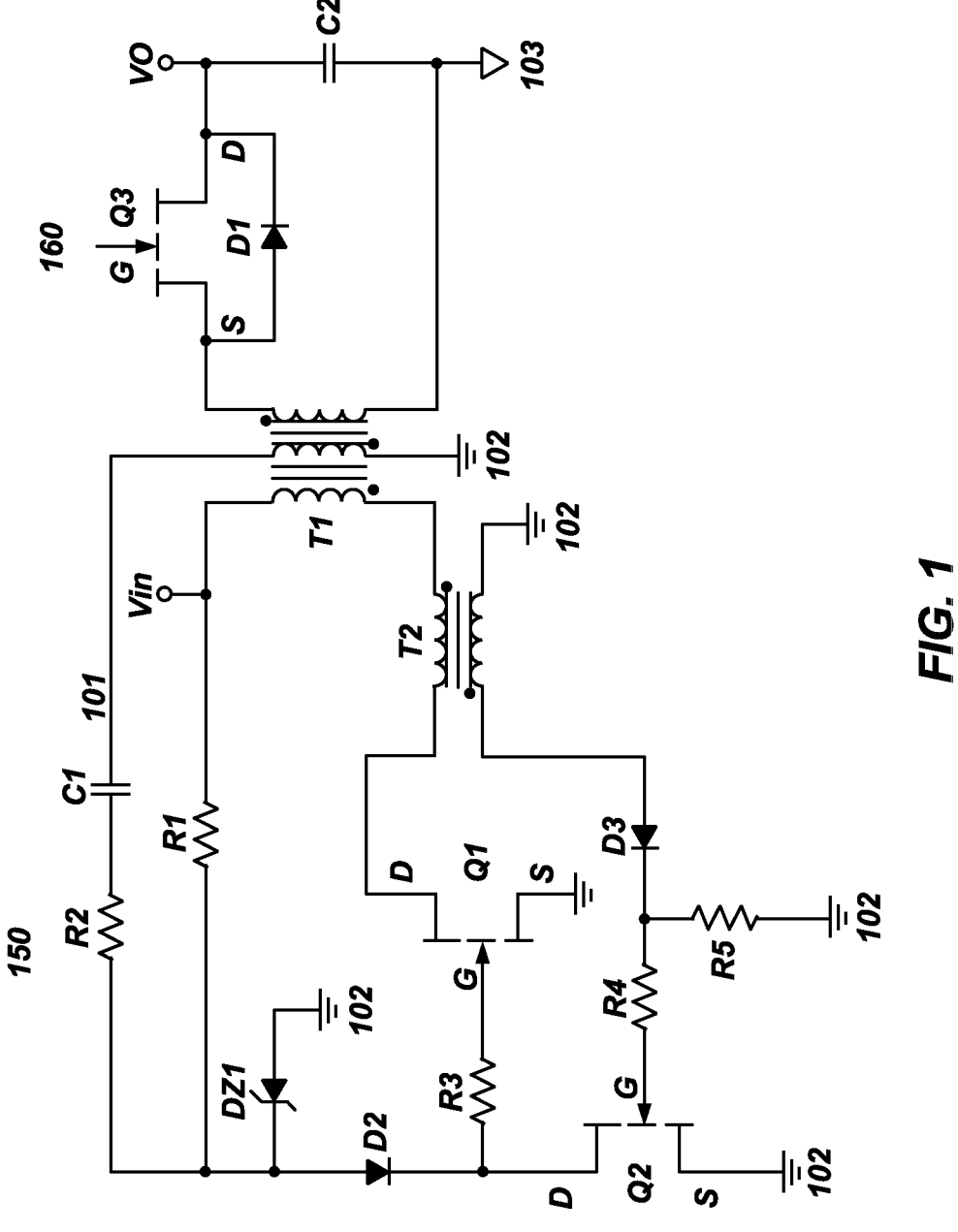
FIG. 1 shows one illustrative embodiment of a self-starting bi-modal operating isolated power converter operating in the transition or self-oscillation mode.

Before the present methods and systems for self-starting bi-modal operating isolated converters are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise. Thus, for example, reference to "a sensor" includes configurations that involve multiple sensors, or multiple types of sensors.

Unless defined otherwise, all technical and scientific terms used herein have the same meanings as commonly understood by one of ordinary skill in the art to which this disclosure belongs.

In describing the technology set forth herein and claiming exclusive rights, the following terminology will be used in accordance with the definitions set out below.

As used herein, Acomprising, @ Aincluding, @ Acontaining, @ Acharacterized by, @ and grammatical equivalents thereof are inclusive or open-ended terms that do not exclude additional, unrecited elements or method steps.

A Self-Starting Bi-Modal Operating Isolated Converter solves the bootstrap problem in isolated power converters by allowing bi-modal operation in a single converter. The converter has bi-modal operation, namely, a transition mode and a fixed frequency mode. The operation of the converter self-starts in the transition mode as a self oscillator and migrates to a fixed frequency operation with regulated output via a closed feedback. In one embodiment, the converter uses Gallium Nitride transistors to control operation in transition mode. The proposed design may be applied to both flyback and buck-derived topologies, achieving high density and efficiency.

Traditionally, the problem of bootstrapping isolated power converters is accomplished by implementing a separate converter that provides isolated power to control the main converter. In prior art the separate converter may be an isolated bootstrapping power supply or a separate housekeeping power supply ready for startup. The instant invention drastically minimizes the size and complexity of current isolated power converters by implementing a self-starting feature, thereby eliminating the isolated bootstrap converter and improving density.

In a self-starting bi-modal operating isolated converter, a converter is designed to begin operation in a transition mode, which is operable to bootstrap the operation of the power converter. In one embodiment, the converter begins in transition mode and migrates to fixed frequency operation with regulated output via a closed feedback. In one embodiment of the converter, the converter is initially turned on in the transition mode via input voltage control of the main switch.

In one illustrative embodiment of the self-starting bi-modal operating isolated converter, the converter operates as a self-oscillator while in the transition mode. The transition mode operation uses a Gallium Nitride transistor to control peak primary inductor current. In one illustrative embodiment, the converter controls peak primary inductor current using the precise and temperature-stable gate-to-source threshold voltage of the Gallium Nitride transistor. In addition, the converter may use the low gate charge present in the Gallium Nitride transistor to help control and turn off of the converter. In one illustrative embodiment, the peak current is varied via the sensor gain. In another embodiment, the peak current is varied by a precise artificially generated offset. In one illustrative embodiment the peak current controls the switching frequency together with the output load. In one embodiment, the use of a Gallium Nitride transistor is to take advantage of the precise, temperature-stable gate-to-source threshold voltage of the Gallium Nitride transistor, as well as the low gate charge present in the Gallium Nitride transistor. In another illustrative embodiment, another type of transistor with similar properties, namely the precise temperature stable gate-to-source threshold voltage and low gate charge, may be used in place of a Gallium Nitride transistor.

In one illustrative embodiment of the self-starting bi-modal operating isolated converter, a Pulse Width Modulator controls the transition from the transition mode to the fixed frequency operation, causing the converter to begin operation in the fixed frequency mode when the pulse width modulator under voltage lockout threshold is reached.

In one illustrative embodiment a Pulse With Modulator controls fixed frequency operation of the converter. Once the converter transitions to the fixed frequency mode, the fixed frequency operation is controlled by the pulse width modulator. The pulse width modulator is secondary ground referenced and controls switching in the fixed frequency mode via galvanic isolation. In one illustrative embodiment, the peak current in transition mode is set higher than the peak current in fixed frequency operation. This prevents interruption or instability while in fixed frequency operation after the bootstrap or transition mode is completed. However, in one illustrative embodiment the transition mode control can still serve as the overall peak current limiter.

In one illustrative embodiment, the Gallium Nitride transistor also helps achieve high efficiency, as the GaN transistor has main switching elements that mitigates switching losses at high switching frequencies. In one illustrative embodiment, synchronous rectification can also be employed for further efficiency gains FIG. 1 shows a circuit diagram of the components operating in one illustrative embodiment of a self-starting bi-modal operating isolated power converter in transition mode. In the embodiment of FIG. 1, the power converter starts in transition mode with an input voltage from a main switch leading to Vin, and operates as a self oscillator to generate an output voltage during startup. In one embodiment, in transition mode, the self oscillator comprises at least an oscillator circuit 101, a first transistor Q1, a second transistor Q2, and a first transformer T1 isolating the primary side 150 from the secondary side 160. In one embodiment, the secondary side comprises a diode D1 for secondary rectification, as well as a third transistor Q3 and an output Vo. It is to be understood that the referencing of particular components in FIG. 1 is not intended to limit the scope of any exclusive rights but are provided to fully disclose the principles taught herein so that the same may be readily carried out in many different forms as will be known to those skilled in the art.

Further shown in FIG. 1, the oscillator circuit 101 is comprised of the first transformer T1, a capacitor C1, and a resistor R2. The oscillator circuit drives the first and second transistors Q1. Q2, and controls the voltage over the gates.

In one embodiment, at least the second transistor Q2 is a Gallium Nitride transistor which provides a fast transition time with a low and temperature stable threshold. In one illustrative embodiment, the second transistor Q2 serves as a current limit for the oscillation in the transition mode. In one illustrative embodiment, the second transistor Q2 controls turn off of the converter, and generates an oscillation for startup. In one illustrative embodiment, the first transistor Q1 is also a Gallium Nitride transistor, providing high frequency switching with fast transitions as well and low losses, and is used to control the current on transistor Q2. In one embodiment, the primary side of the oscillator is isolated from the secondary side by Transformer T1. In one illustrative embodiment, the converter is initially turned on via an input voltage Vin on the main switch.

FIG. 1 also shows a second transformer, T2, connected to the circuit. The second transformer T2, may be a current sense transformer to provide current sense in the self oscillation during the transition phase. In one illustrative embodiment, the converter operating in transition mode and the self oscillation is used to generate a voltage during startup of the converter. FIG. 1 also shows a diode D1 on the secondary side which acts for current rectification on the secondary side. In another illustrative embodiment, diode D1 may be replaced with an appropriate circuit for rectification on the secondary side In one embodiment of a self-starting bi-modal operating isolated power converter, the self oscillator comprising the transition mode shown in FIG. 1 may comprise a primary side and a secondary side. In one illustrative embodiment, the first and second transistors Q1, Q2 are Gallium Nitride transistors. In another illustrative embodiment, the transistors are any transistors that have the necessary properties exhibited by Gallium Nitride transistors. In one illustrative embodiment, these necessary properties include a temperature stable gate to source threshold, fast switching, and current threshold similar to that of a Pulse Width Modulator used to control the fixed frequency mode. In one embodiment, the transistors are used to control peak primary inductor current in the transformer and regulate the self-oscillation in the startup mode.

FIG. 1 also shows several other components which help the self-oscillator function. These include Resistors R1, R3, R4, R5; Capacitors C2; Diodes D2, D3; Zener Diodes Dz. The primary side and secondary side of the power converter may be further isolated by referencing different grounds as shown in the diagram, the primary ground 102 may be different than the secondary ground 103, as shown in the circuit diagram. In another illustrative embodiment, the primary ground 102 may refer to one or more grounds that may be separate from one another. Power output may be via Vo on the secondary side. In one illustrative embodiment, the circuit may operate as known in the art, and additional components may be added as required to achieve specific results for specific current and voltage combinations.

Figure 2:
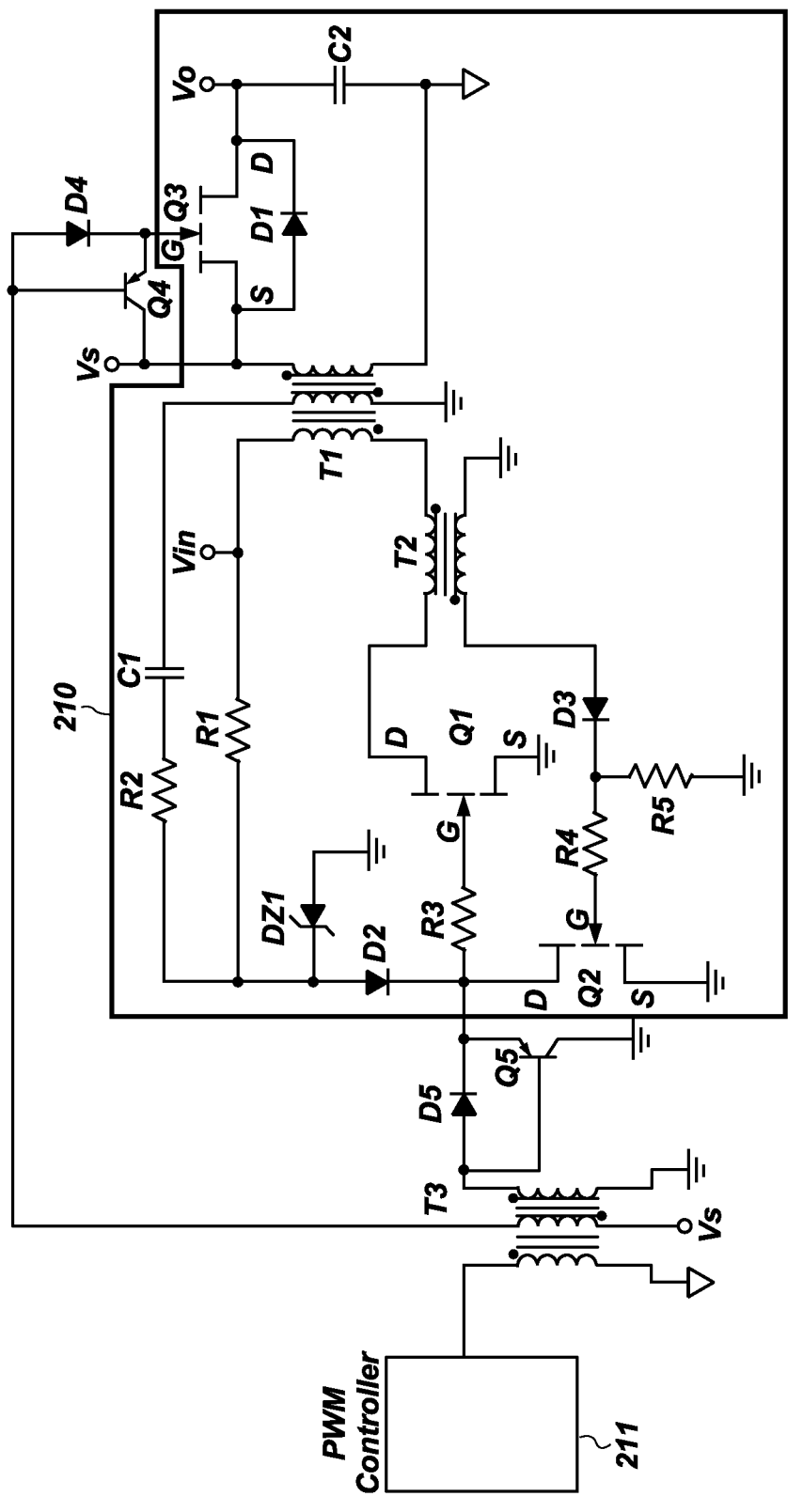
FIG. 2 shows one illustrative embodiment of a self-starting bi-modal operating isolated power converter operating in the fixed frequency mode.

FIG. 2 shows the operation of a self-starting bi-modal operating isolated converter in fixed frequency mode. As shown in FIG. 2, the circuit involved in fixed frequency mode includes the circuit which operates in transition mode 210. This allows for less space being taken up by the power converter and allows the power converter to operate without requiring a second power converter to operate in order to have the power supplied and isolated. It is to be understood that the referencing of particular components in FIG. 2 is not intended to limit the scope of any exclusive rights but are provided to fully disclose the principles taught herein so that the same may be readily carried out in many different forms as will be known to those skilled in the art.

In one illustrative embodiment shown in FIG. 2, a pulse width modulator 211 is connected to the self-oscillator circuit 210 via a transformer T3. In one illustrative embodiment, the pulse width modulator controller receives voltage from Vo, and causes the converter to transition to fixed frequency operation when the under voltage lockout threshold of the pulse width modulator is triggered as Vo increases. In one illustrative embodiment, transformer T3 is also connected to the third transistor Q3 and a fourth transistor Q4 on the secondary side. In one illustrative embodiment, the pulse width modulator 202 drives transformer T3 which duty cycles the circuit containing the third Q3 and fourth Q4 transistors to regulate the output voltage. In one illustrative embodiment, rectification on the secondary side is controlled by the third transistor Q3 when the power converter is in fixed frequency mode. In one illustrative embodiment, in addition to the first Q1 and second Q2 transistors being gallium nitride transistors, the third Q3 and fourth Q4 transistors are additionally gallium nitride transistors. In the case of the first Q1 and third Q3 transistors, in another illustrative embodiment, they may be another equivalent transistor type which provides high frequency switching and fast transitions with low losses. In one illustrative embodiment, the current limit for the second transistor Q2 must be set higher than the steady state maximum load at Vo in order to prevent interferences in the fixed-frequency operation. In one illustrative embodiment, the primary ground 202 is different from the secondary ground 203. It will be noted that the pulse width modulator is referenced to the secondary ground 203. In one illustrative embodiment, the various grounds may be separately referenced in order to further isolate the elements of the disclosed embodiment.

FIG. 2 also shows several other components operating in the circuit in fixed frequency mode. These include Resistors R1, R3, R4, R5; Capacitors C2; Diodes D2, D3; Zener Diodes Dz, an additional transistors Q25, primary ground 202, secondary ground 203, voltage in Vin on the primary side, and voltage out Vo on the secondary side, as well as a supply voltage Vs. In one illustrative embodiment, the circuit may operate as known in the art, and additional components may be added as required to achieve specific results for specific power supply needs.

Figure 3:
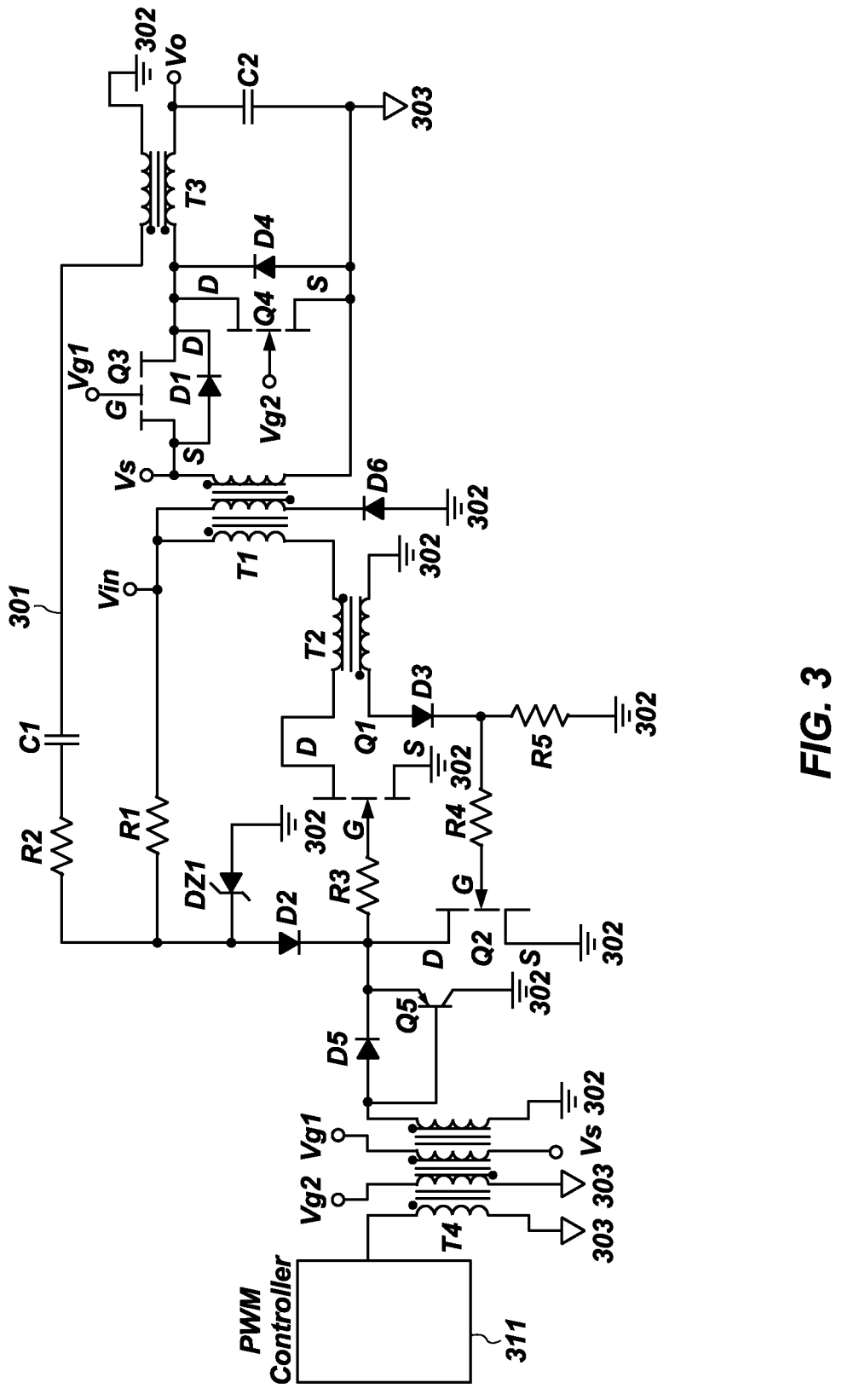
FIG. 3 shows an illustrative circuit diagram of one embodiment of a self-starting bi-modal operating isolated power converter.

FIG. 3 shows another illustrative embodiment of a self-starting bi-modal operating isolated converter. It will be noted that in FIG. 3, the oscillator circuit 301 is connected to a third transformer T3. FIG. 3 shows the self oscillator circuit having a pulse width modulator 311 connected to the remaining circuit via a fourth transformer T4. In one illustrative embodiment, the fourth transformer provides isolation from the primary side gate to drive the secondary and 180 degree phase in the fixed frequency mode. In one illustrative embodiment, VG1 and VG2 are isolated gate drive signals which are 180 degrees out of phase. In one illustrative embodiment, VG1 and VG2 regulate the output voltage after startup. In one illustrative embodiment, a first transformer T1 provides isolation from the primary to the secondary sides. A second transformer T2 may provide a current sense for the self oscillation of the transition phase, and a third transformer T3 provides state detection while in the transition phase. In one illustrative embodiment, at least a second transistor Q2 is a gallium nitride transistor which provides a current limit to regulate the self-oscillation operation of a first transistor Q1. In one illustrative embodiment, the second transistor Q2 may have a low gate to source threshold voltage across it to effectively regulate the first transistor Q1. In one illustrative embodiment, the converter transitions to fixed frequency operation when the under voltage lockout threshold of the pulse width modulator 311 is triggered. Again, a primary ground 302 and secondary ground 303 may be present to help isolate the two sides. It is to be understood that the referencing of particular components in FIG. 3 is not intended to limit the scope of any exclusive rights but are provided to fully disclose the principles taught herein so that the same may be readily carried out in many different forms as will be known to those skilled in the art.

In one illustrative embodiment, the circuit may be constructed out of radiation hardened components and creates a radiation hardened power converter.

Figure 4:
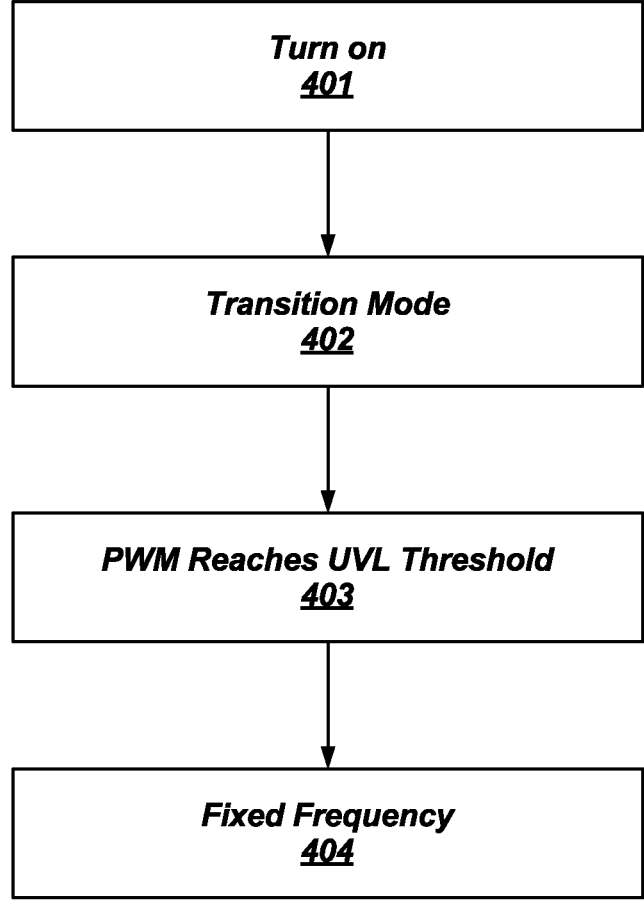
FIG. 4 shows a block diagram of the operation of one illustrative embodiment of a self-starting bi-modal operating isolated power converter.

In operation, a self starting bi-modal operating isolated power converter operates as shown in FIG. 4. In step 401, a circuit comprising a primary side and a secondary side, galvanically isolated, a pulse width modulator galvanically isolated from the primary and secondary sides, and a number of Gallium Nitride transistors. In one illustrative embodiment, in step 401, the converter is initially turned on via an input voltage control of the main switch. When initially turned on 401, the converter is initially in transition mode. After being turned on 401, the converter operates in transition mode 402. When operating in transition mode, a self oscillator circuit is used to generate an output voltage during startup. In one illustrative embodiment, the oscillator circuit drives two transistors on the primary side. In one illustrative embodiment, the second transistor provides a current limit (with a low gate to source threshold) to the self-oscillation of the first transistor. In one illustrative embodiment, the transistor is a Gallium Nitride transistor which provides a fast transition with a low and temperature stable gate to source threshold which serves as a current limit for the oscillation mode. During transition mode and self-oscillation, a pulse width modulator is connected to the oscillator circuit, but is disabled by the Under Voltage Lockout Threshold (UVLO). As the converter self oscillates in transition mode, the under voltage lockout threshold (UVLO) of the pulse with modulator is reached 403.

Once the pulse width modulator reaches under voltage lockout threshold 403, the converter begins operation in fixed frequency mode 404. In fixed frequency mode 404, the pulse width modulator controls operation of the converter. The peak current in fixed frequency mode is set lower than the peak current in transition mode, which prevents interruption or instability of the operation while in fixed frequency operation. In one illustrative embodiment, the transition mode control can still serve as the overall peak current limiter. In one illustrative embodiment, a high efficiency is achieved using Gallium nitride transistors for the main switching elements to mitigate switching losses at high switching frequency. In one illustrative embodiment, synchronous rectification is used to give further efficiency gains.

Figure 5:
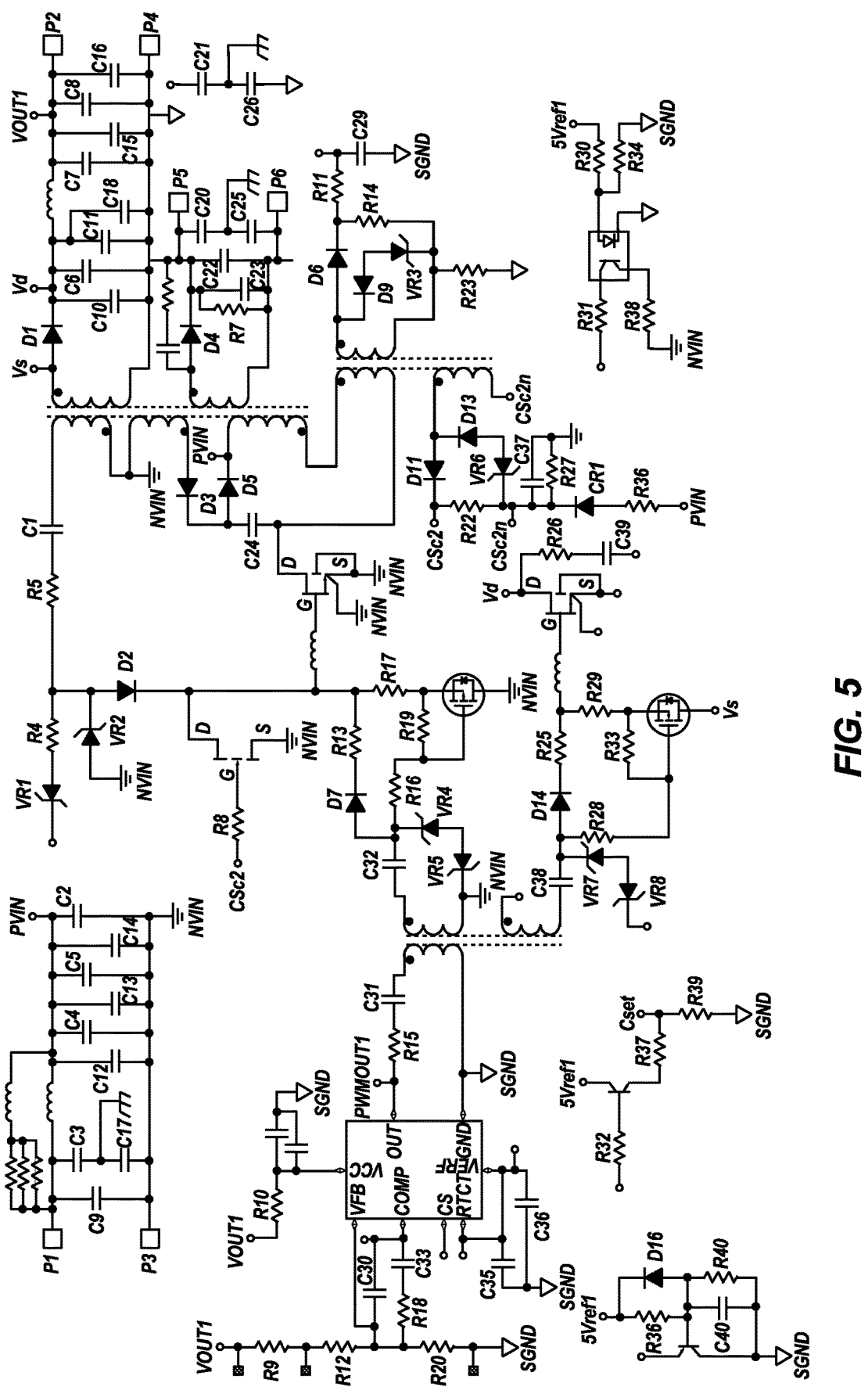
FIG. 5 shows a full circuit diagram of one illustrative embodiment of a self-starting bi-modal operating isolated power converter.

FIG. 5 shows a circuit diagram of one embodiment of a self-starting bi-modal operating isolated converter. It is to be understood that the circuit diagram in FIG. 5 is to be taken as exemplary and not limiting. The precise values of specific electrical components may be varied to suit a specific power source as is known in the art. Likewise, specific circuit branches may be altered in equivalent ways to provide the results desired in the circuit diagram shown in FIG. 5. In FIG. 5, the Pulse Width Modulator and its control circuit is galvanically isolated through a transformer from the rest of the power converter. One or more GaN transistors may be connected to the control circuit, which may be connected to a power circuit via additional transformers. It is to be understood that the referencing of particular components in FIG. 5 is not intended to limit the scope of any exclusive rights but are provided to fully disclose the principles taught herein so that the same may be readily carried out in many different forms as will be known to those skilled in the art.

In one illustrative embodiment, the pulse width modulator may be a radiation hardened, high performance industry standard single-ended current mode pulse width modulator (PWM). In one illustrative embodiment, the pulse width modulator may be an ISL78841ASRH or similar. In another illustrative embodiment, the PWM may be of any type known in the art that serves to regulate the fixed frequency operation of a power converter.

In one illustrative embodiment, the GaN transistors may be 100V GaN transistors that have a temperature stable gate-to-source threshold voltage and a low gate charge. In one illustrative embodiment they may be GS61008P transistors or GS61004B transistors, or similar Galium Nitride transistors. In another illustrative embodiment, the transistors may be of another type that has similar properties. The GaN transistors may be used to achieve a high efficiency in the power converter by serving as the main switching elements. This may help mitigate switching losses at high switching frequency. In another illustrative embodiment, synchronous rectification may be used to further improve efficiency.

It is to be understood that additional components are utilized as shown in the representative circuit diagram in FIG. 5. These components may include metal-oxide semiconductor field-effect transistors, coaxial connectors, a transistor output optocouple, diodes of either 150V or 75V and current regulators. It is to be understood that any specifications of these particular components is for exemplary purposes only and is not meant to be limiting. The specifications of the components may be adjusted to fit the precise circuit being created for the particular conditions of the circuit and the specific power converter the components in which they operate. It is to be understood that the use of Gallium Nitride transistors is due to several properties of Gallium Nitride transistors, but which may be theoretically replaced with other transistors that have the same properties, whether future developments or currently known transistors. The essential properties which replacement transistors would require would include a gate-to-source threshold that is stable over temperature, and have a threshold which is on the order of 2V in the same range as the pulse width modulator, but which is far from the threshold of fixed frequency operation, in order to avoid problems during fixed frequency operation. In addition, the properties would include the ability to quickly switch with a fast switching around 4 KHz.

In the foregoing Detailed Description, various features of the present disclosure are grouped together in a single embodiment for the purpose of streamlining the disclosure. This method of disclosure is not to be interpreted as reflecting an intention that the claimed disclosure require-s more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed:

1. A self-starting bi-modal operating isolated power converter comprising:

a voltage source;

one or more transistors;

a pulse width modulator;

a self oscillator circuit, comprising a first transformer, a capacitor, and a resistor;

wherein the pulse width modulator is connected to the self oscillator circuit in such a way as to be switched off until an under voltage lockout threshold is reached;

wherein the one or more transistors control a peak current through the first transformer and control self oscillation in a transition phase;

wherein the pulse width modulator is connected to the self oscillator circuit via a second transformer in such a way that upon reaching the under voltage lockout threshold, the pulse width modulator causes the isolated power converter to shift to operate in a fixed frequency mode, regulated by the pulse width modulator;

wherein the pulse width modulator controls the fixed frequency mode of the isolated power converter via galvanic isolation; and wherein the peak current of the transition mode is set higher than the peak current in the fixed frequency mode to prevent interruption or instability while in the fixed frequency mode.

2. The self-starting bi-modal operating isolated power converter of claim 1, wherein each of the one or more transistors is a Gallium Nitride transistor.

3. The self-starting bi-modal operating isolated power converter of claim 1, wherein each of the one or more transistors has temperature-stable gate-to-source threshold voltage.

4. The self-starting bi-modal operating isolated power converter of claim 1, wherein each of the one or more transistors has a low gate charge.

5. The self-starting bi-modal operating isolated power converter of claim 1, wherein each of the one or more transistors has a high effective switching frequency.

* * * * *